June 21, 1955  E. G. GLOSSBRENNER  2,711,528
WAKING ALARM DEVICE FOR VEHICLE OPERATORS
Filed Sept. 10, 1954  2 Sheets-Sheet 1

INVENTOR
EARL G. GLOSSBRENNER,
BY
McMorrow, Berman + Davidson
ATTORNEYS

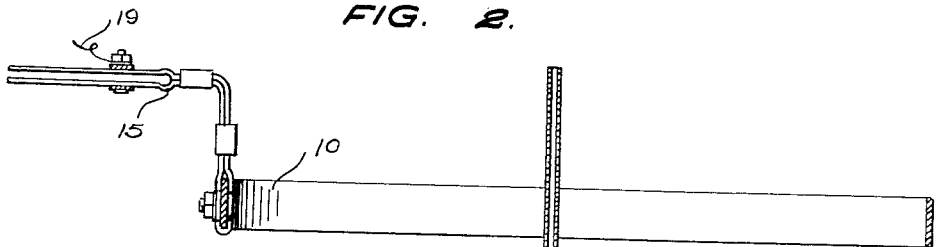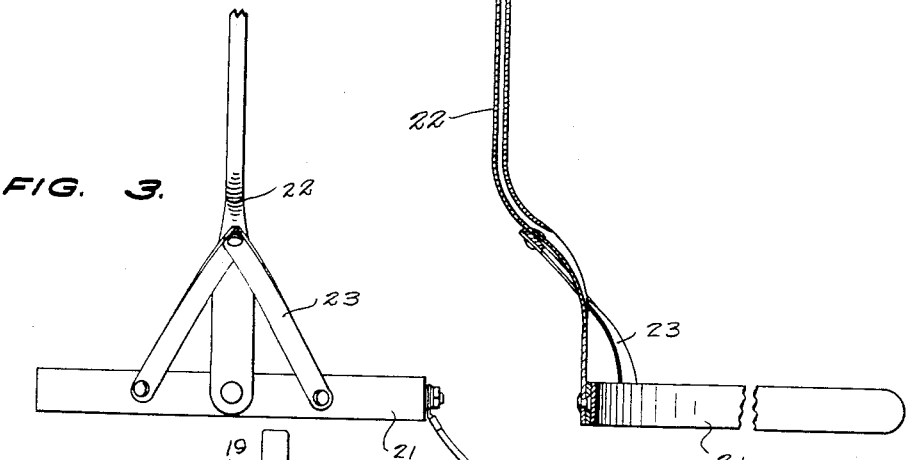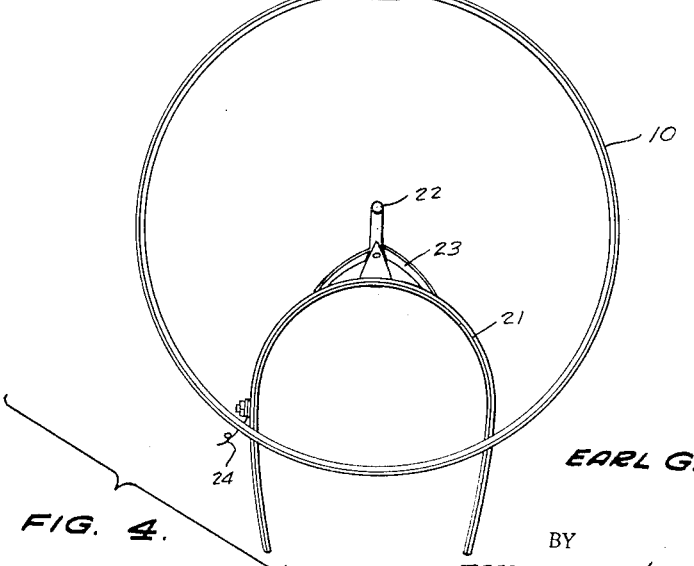

United States Patent Office 2,711,528
Patented June 21, 1955

2,711,528

WAKING ALARM DEVICE FOR VEHICLE OPERATORS

Earl G. Glossbrenner, Menard, Tex.

Application September 10, 1954, Serial No. 455,108

3 Claims. (Cl. 340—279)

The present invention relates to an alarm for attaching partly to a vehicle and partly to the head of the vehicle operator so that the alarm is set off upon any abnormal nodding of the head of the operator as the operator falls asleep.

The principal object of the present invention is to provide an easily constructed and lightweight device which will sound the horn of the vehicle upon any abnormal back and forth or side to side movement of the operator's head out of normal operating position.

Another object of the present invention is to provide an alarm device connected to the horn of the vehicle which may be adjustably positioned over the head of the operator of the vehicle and when dislodged by accidental movement of the head or by sounding of the alarm as it is intended to be used, the device may be quickly re-adjusted to normal operating position and may further be adjusted forward and backward within the vehicle and from side to side so that the operator can shift his normal driving position as it suits him.

These and other objects and advantages of the present invention will be fully apparent from the following description when considered in connection with the annexed drawings, in which:

Figure 2 is a side plan view, partly in section, of the two portions of the invention in their relative positions of operation;

Figure 3 is a partial front elevational view of a portion of the invention;

Figure 4 is a top plan view showing the two portions of the invention in their relative positions of operation.

Figure 1:
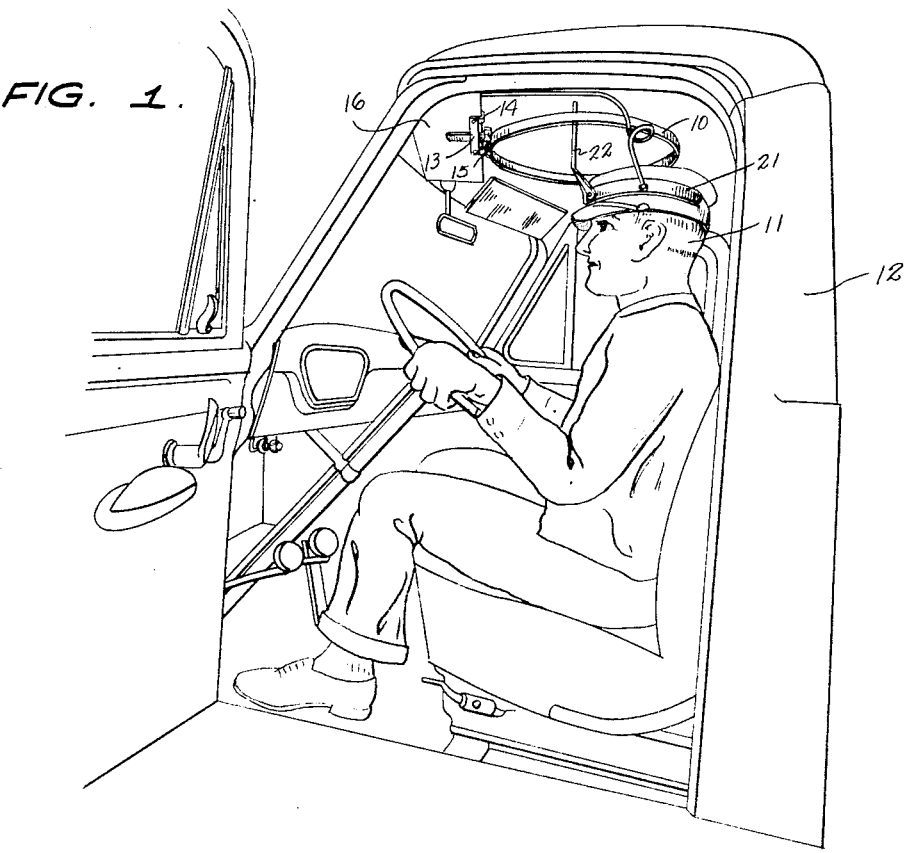
Figure 1 is a view of an automobile or truck with an operator seated and with the present invention installed above the operator's head.

Referring in greater detail to the drawings in which like numerals indicate like parts throughout the several views, the present invention will be seen to consist of a first portion having a loop 10 disposed substantially horizontally a short distance above the head 11 of the operator of the vehicle 12 as seen in Figure 1. A bracket 13 having two U-shaped legs 14 and 15 is shown fastened to the free edge of the sun visor 16 of the vehicle 12.

Figure 5:
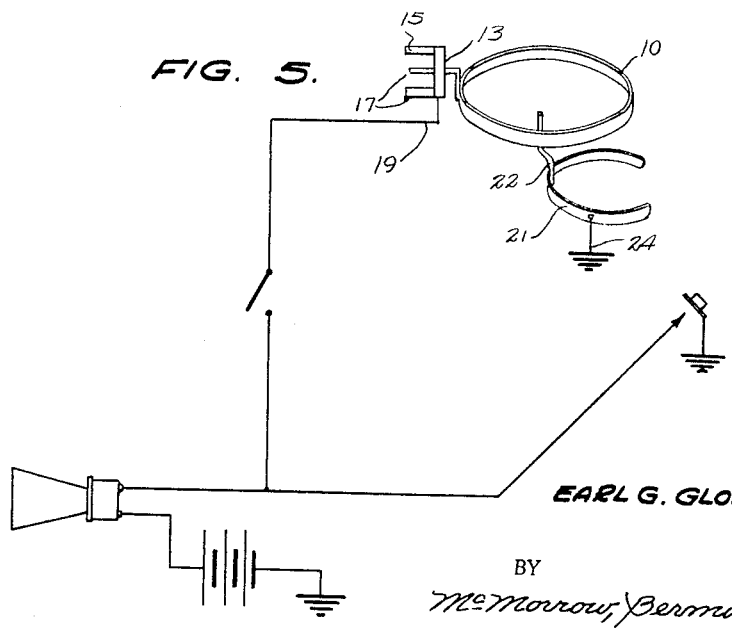
Figure 5 is a schematic view showing the electrical connections of the two portions of the invention.

As seen in Figure 2, the bracket 13 receives the outwardly projecting and off-set supporting tongue 17 of the loop 10. A wire 19 connects the bracket 13 and the loop 10 to the electrical circuit of the electrically driven horn, as seen in Figure 5. The loop 10 is fabricated from lightweight and rigid metal while the bracket 13 and the tongue 17 are constructed of somewhat stiffer and heavier metal.

The second portion of the present invention has a resilient band 21 of brass or other conductive metal and is secured to a vertically extending rod 22 having the braces 23 on either side so that the rod 22 is not easily displaced from the vertical position when the band 21 is mounted on the operator's cap or hat as seen in Figure 1.

A second wire 24 extends from the band 21 and is connected to some grounding portion of the vehicle to complete the electrical circuit to the horn 21 whenever the rod 22 contacts the loop 10 in any abnormal movement back and forth or from side to side of the operator's head.

Obviously, sufficient space must be given to the rod 22 within the loop 10 so that in normal vehicle operating position, the operator may turn around, may look out the side windows, may reach into the glove compartment and do other things in normal vehicle operating position without permitting the rod 22 to contact the loop 10.

It has been observed that most if not all persons who tend to fall asleep while driving either as the operator or as a passenger in the vehicle nod their heads sometimes quite suddenly and with a relatively large movement of the head upon their first inclination to fall asleep. The present invention provides that the first nod of the head of the operator of the vehicle out of normal vehicle operating position, the loop 22 will be struck by the rod 10 and the horn will bring the operator to full wakefulness. Because the tongue is only loosely and slideably connected to the bracket, the loop may be re-set to whatever position is desired.

While only a single embodiment of the present invention has been here illustrated and described, it is believed that other embodiments may be made and practiced within the scope of the appended claims without departing from the spirit of the invention.

What is claimed is:

1. An alarm device to awaken a dozing operator of a vehicle upon nodding of the operator's head comprising a first electrical contact member supported on said vehicle in spaced relation relative to the head of the operator of the vehicle when in normal vehicle operating position and being selectively connected to the circuit of the electrically-driven horn of the vehicle, and a second electrical contact member adapted to be carried by the operator's head when in normal vehicle operating position out of contact with said first contact member and being movable into contact therewith upon movement of the head out of normal vehicle operating position, said second contact member being connected to said circuit of said horn for actuation thereof when in contact with said first electrical contact member.

2. An alarm device to awaken a dozing operator of a vehicle upon nodding of the head comprising a substantially horizontally disposed hollow contact member supported on said vehicle adjacent to and in spaced relation to the operator's head when in normal vehicle operating position and being electrically connected to the circuit of the electrically-driven horn of said vehicle, and a normally vertically disposed rod contact member adapted to be carried by the operator's head when in normal vehicle operating position within and out of contact with said hollow contact member and being movable into contact therewith upon movement back and forth and from side to side of the head of the vehicle operator out of normal vehicle operating position, said rod contact member being connected to said circuit of said horn for actuation thereof when in contact with said hollow contact member.

3. An alarm device to awaken a dozing operator of a vehicle upon nodding of the operator's head comprising a substantially horizontally disposed electrically conducted loop supported on said vehicle adjacent to and in spaced relation to the operator's head when in normal vehicle operating position and being electrically connected to the circuit of the electrically-driven horn of said vehicle, an electrically conducted rod, a metallic resilient band member adapted to be supported on the operator's head, said band member being connected to said rod for support thereof in a vertically extended position within said loop and normally out of contact therewith when said operator is in normal vehicle operating position, said rod being movable into contact with said loop upon movement back and forth and from side to side of the head of the vehicle operator when out of normal vehicle operating position, said band member being connected to said circuit of said horn for actuation thereof when in contact with said loop.

References Cited in the file of this patent

UNITED STATES PATENTS

| | | |
|---|---|---|
| 2,054,484 | Patterson | Sept. 15, 1936 |
| 2,215,985 | Stankey | Sept. 24, 1940 |